July 19, 1949.   A. J. BACHELDER   2,476,576
STEREO CAMERA FILM AND SHUTTER WIND
Filed April 19, 1946   2 Sheets-Sheet 1
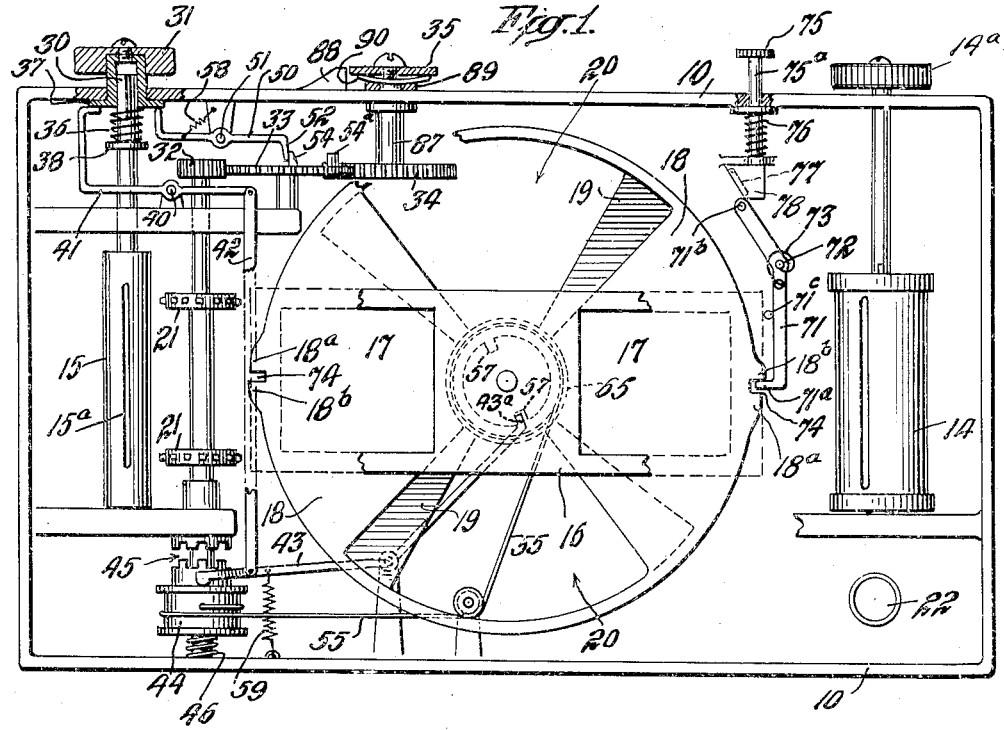
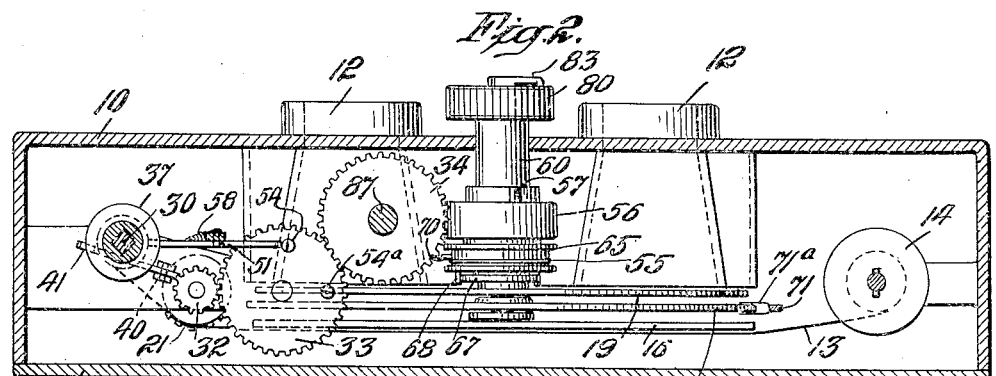
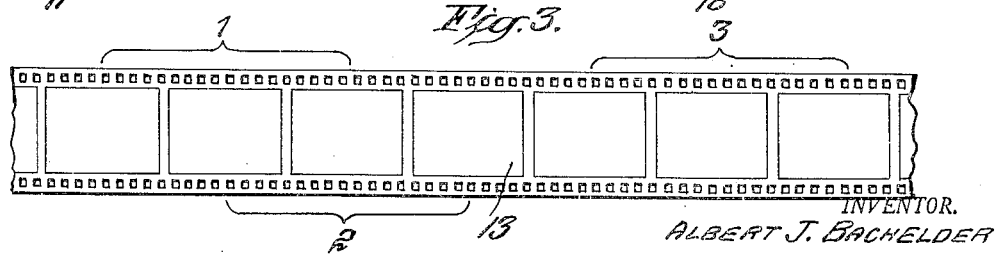
INVENTOR.
ALBERT J. BACHELDER
BY
Watson, Bristol, Johnson & Leavenworth
ATTORNEYS

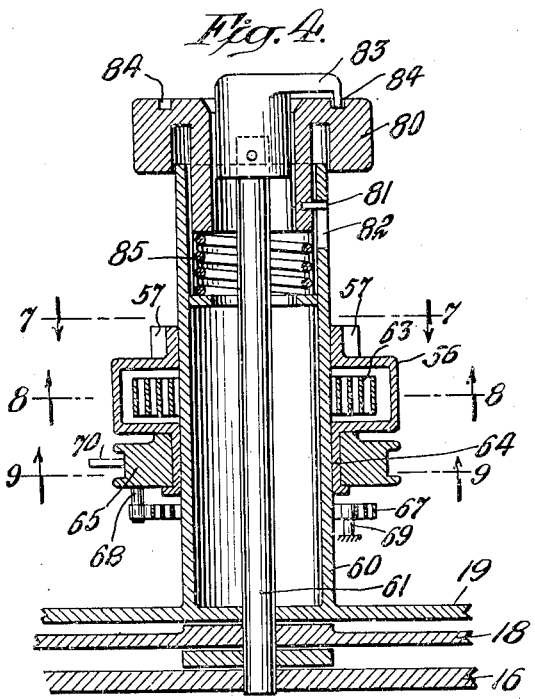

Patented July 19, 1949

2,476,576

UNITED STATES PATENT OFFICE 2,476,576

STEREOCAMERA FILM AND SHUTTER WIND

Albert J. Bachelder, Lexington, Mass., assignor to Polaroid Corporation, Cambridge, Mass., a corporation of Delaware Application April 19, 1946, Serial No. 663,542

4 Claims. (Cl. 95—18)

The present invention is concerned with improvements in the structure and operating mechanism and characteristics of photographic devices. The arrangement is of particular advantage in stereoscopic cameras, and the invention is specifically illustrated in connection with such a device, although, as will appear, many features are capable of application to cameras of different types and to devices in general employed in taking or exposing of photographic images.

The invention provides a relatively simple and economical design for a high quality camera. This results largely from the manner in which the various operating parts and functions are related one to the other. A particular feature is in the novel manner in which a single manually operable element serves the several functions of cocking the shutter, drawing the film across the framing plate and winding it on the takeup spool and, through an associated automatic stop means, measuring off the film to locate properly the appropriate film frames over the exposure apertures. Because of the desirability of spacing the frames of a given pair of stereoscopic images by one or more intervening frames on a film to preserve the inter-ocular distance and at the same time utilize all of the frames on the film, it is necessary that the film be advanced unequal distances for successive exposures. On the other hand, the cocking of the shutter each time is substantially a fixed cycle. The arrangement here provided nevertheless enables both these functions of cocking the shutter and advancing the film the different distances to be performed from a single manually operable member.

The mechanism includes a rotary shutter provided with angularly spaced openings adapted to control simultaneously the two exposure apertures, the shutter having associated therewith spring tensioning means therefor constrained between the shutter and a rotary follow-up drum. Upon release, the shutter is advanced a predetermined angle through an exposure position, and re-cocking or re-tensioning of the spring is effected by advancing the drum an equal angle following each exposure. Both the shutter and the drum advance successively in the same direction, and no reverse movement of the shutter is required in the cocking operation. The successive advances of the spring restraining means are achieved through novel operating means which includes a concentrically mounted oscillatable drum. Although the movements of the shutter comprise a progressive step-by-step advance in the same rotary direction, the spring tension thereon for each operation is nevertheless uniform for any given setting of shutter speed or exposure time interval.

The invention is further characterized by a structural and functional association of certain elements for adjusting the shutter speed. The shutter embodies two plate sections provided with concentric coaxial stem parts extending to exteriorly of the camera. By the arrangement provided, relative angular adjustment between these coaxial elements effects not only an angular adjustment of the shutter disks and thereby an adjustment of the shutter openings, but also an adjustment of the tension of the shutter operating spring. The lesser the effective opening, the greater the tension, and conversely. The result is a wide range of selectable time intervals for so-called automatic instantaneous exposures.

An important feature of the invention resides in the combination of the above described principles and relation of elements in a rotary shutter for stereoscopic cameras wherein simultaneous shutter operation occurs at both apertures. The substantially integral relationship of both portions of the shutter ensures the same operation at the same time at both apertures, and adjustments affect each in the same manner.

Other objects of the invention will in part be obvious and will in part appear hereinafter.

The invention accordingly comprises the features of construction, combination of elements, and arrangement of parts which will be exemplified in the construction hereinafter set forth, and the scope of the application of which will be indicated in the claims.

For a fuller understanding of the nature and objects of the invention, reference should be had to the following detailed description taken in connection with the accompanying drawings, in which:

Fig. 1 is a rear view of the camera with the rear plate removed and portions of the casing partitions broken away;

Fig. 2 is a top plan view with the casing broken away;

Fig. 3 is a section of the film illustrating the location and spacing of the pairs of images;

Fig. 4 is a fragmentary sectional view taken through the axis of the shutter mechanism;

Fig. 5 is a front end view of the shutter adjusting mechanism;

Fig. 6 is a top plan view looking down on the counter dial of Fig. 1;

Fig. 7 is a cross-sectional view taken on the line 7—7 of Fig. 4;

Fig. 8 is a similar view through the spring drum taken on the line 8—8 of Fig. 4;

Fig. 9 is a similar cross-sectional view through the shutter spring tensioning drum taken on the line 9—9 of Fig. 4; and Fig. 10 is a detail view of the shutter release trigger of Fig. 2 but looking from the reverse side.

The stereoscopic camera embodying the invention includes a main casing 10 provided with a rear cover plate 11 and appropriate inner partitions. A pair of lens mounts 12 contain suitable lenses adapted to transmit a pair of stereoscopic images to a continuous strip roll type film 13, the film supply cartridge being shown at 14 and the takeup spool at 15. Mounted within the casing is a framing plate 16 having spaced framing apertures 17. The axes of the lens mounts 12 and the framing plate apertures 17 are spaced by the chosen inter-ocular distance. Forwardly of the framing plate 16 is mounted a rotary shutter means comprising a rear shutter disk 18 and a front shutter disk 19. The two shutter disks normally rotate together but may be angularly adjusted with respect to each other to vary the effective exposure openings 20 therein in a manner to be later described in more detail.

The film proceeds from the supply cartridge 14 along a suitably provided channel at the rear of framing plate 16, over double sprocket 21, to the takeup spool 15, which has a slot 15a to receive the leading end. Suitable pressure pad rolls and guides may be provided for the film, the details of which form no part of the present invention and are omitted from the drawings in the interest of clarity. The camera will preferably embody a viewfinder, an aperture therefor being shown at 22, in Fig. 1. The camera normally will also embody various other details unnecessary to illustrate in the present case.

The means for advancing the film will now be described. The upper end of the shaft carrying the takeup spool 15 is provided with a squared end 30 or other suitable splined construction, adapted to receive the manually operable knob 31 whereby the knob is slidable thereon but capable of rotating the takeup spool 15. The measuring sprocket 21 is provided with the usual teeth engaging in marginal holes of the film in accordance with standard construction. Rotation of the knob 31, and advance of the film over the sprocket 21, causes the rotation of gear 32 secured to the upper end of the sprocket shaft. Meshing with gear 32 is a control gear 33, and a gear 34 in turn meshes with gear 33, the shaft to which gear 34 is secured having frictionally secured on the upper end thereof a counter dial 35, to be later described in more detail.

The knob 31 is adapted in its rotation to perform the three functions of advancing the film across the framing plate and positioning it with the frames in proper position for exposure, winding the film on the takeup spool 15, and cocking the rotary shutter means. The knob 31 normally occupies the outer position shown in Fig. 1. Assuming that a film has been threaded in the camera and the first stereo pair of film frames have been exposed, to set the camera for the next exposure the knob 31 is first depressed downwardly against the force of spring 36, the spring being confined between a plate 37, rigid with the knob 31, and a collar 38 secured on the takeup spool shaft. Pivoted at 40 to a casing part is a lever 41 having an upstanding finger adapted to engage under the plate 37. The opposite end of lever 41 has pivoted thereto a link 42, the lower end thereof, in Fig. 1, being pivoted to a lever 43 provided at its end adjoining the link 42 with a fork straddling a hub portion of a cable drum 44. In the position shown in Fig. 1, the drum is freely rotatable on the film sprocket shaft, but is adapted to be clutched thereto. In the specific form shown, the clutch 45 comprises complementary spline parts, one of which is integral with the drum 44, and the other secured to the film sprocket shaft. Depression of the knob 31 rocks the lever 41 and, through the connected linkage, rocks the lever 43 clockwise, in Fig. 1, permitting the drum 44 to move upwardly under the pressure of a spring 46, causing engagement of the clutch.

Depression of the knob 31 and its plate 37 serves also to rock a lever 50 pivoted in the casing at 51, the lever having a finger engaging the under surface of the plate 37, and a finger 52 on the opposite end normally on the path of pins 54 and 54a, secured to the upper surface of the gear 33. Rocking of the lever 50 swings the finger 52, however, out of the path of these pins. Assuming a film has been threaded through the camera and in position to be wound on spool 15 as will later be described, and assuming that the knob 31 has been depressed, the knob is initially given a slight rotation in the clockwise direction, in Fig. 2, which advances the film a small distance, rotating the sprocket 21 and thereby the gears 32 and 33 through a small angle, whereby the pin 54 passes slightly beyond the end of the film stop arm 50. Simultaneously, the drum 44, having been clutched to the sprocket shaft 21, is rotated a corresponding angle, winding a shutter cocking cable 55 thereon. The opposite end of cable 55 is connected to rotate a drum coaxial with the shutter and thereby through a pawl to rotate a second coaxial drum 56, which serves to increase the tension on the shutter operating spring. The details of this mechanism and operation will be later described, but for the moment it is noted that drum 56 is provided with a pair of notches 57 adapted alternately to receive the lug 43a on lever 43 which serves to lock the drum 56 in the corresponding positions. Lug 43a having been withdrawn from locking notch 57 in shutter spring drum 56, the slight initial rotation of the drum by the withdrawal of cable 55, and operation of mechanism to be described, advances the drum sufficiently so that the lug 43a now rides on the surface of the drum.

The hand knob 31 is now permitted to move to its outer position under the urge of spring 36, and is then further rotated in the same clockwise direction to complete the operations of advancing the film to its next position and the cocking of the shutter mechanism. Rotation of the knob 31 continues until the next pin 54a on gear 33 engages the film stop lever 50. This occurs by reason of the fact that the lever 50 has been returned to the position shown in Fig. 1, by suitable means such as the spring 58. The film has now been advanced one frame and the shutter cocked through certain mechanisms, the details of which will be further explained. For the time being it is noted, however, that lug 43a on the shutter lock lever has engaged in the next notch 57 of the shutter spring drum 56 under the action of a spring 59 which dominates the force of spring 46 located under the cable drum 44, permitting downward movement of drum 44 and disengagement of clutch 45. This is timed to occur simultaneously with, or preferably a little in advance of, the stopping of the film feed.

After exposure of the film in this position, upon the next advance of the film through the means thus far described, the film will be advanced a distance of three frames until the pin 54 again comes into engagement with the film stop arm 50 in the position shown in Fig. 1. For this purpose, the pins 54 and 54a are spaced apart distances of 90° and 270°, respectively. It should be observed, however, that the cocking of the shutter was fully effected within the initial portion of the rotation of knob 31 which advanced the film a distance of one frame or a little less. The arrangement of the pairs of images on the film will be later described, but for the present it may be noted that, assuming a standard 35 mm. film, the film frames of a given pair of stereoscopic images will be spaced by one intervening frame.

The details of the shutter mechanism will now be described. As shown particularly in Fig. 4, projecting axially from the front shutter plate 19 and rigid therewith is a stem-like sleeve 60; and located concentrically therein is a stem 61 secured to the rear shutter plate 18. The main spring drum 56 is concentrically mounted about the sleeve 60. In the middle enlarged portion of drum 56 is located a main spring 63, the outer end of which is secured to the drum 56 and the inner end to the sleeve 60, as shown particularly in Fig. 8. The drum 56 has a lower cylindrical portion 64 of reduced diameter, about which is mounted the oscillatory cable drum 65 upon which is wound one end of cable 55 heretofore described. The cable drum carries a pawl 66 adapted to engage in the notches 62 located 180° apart in the periphery of the lower portion 64 of the main drum 56. The winding up of the cable 55 on the drum 44 in the manner heretofore described rotates the drum 65 in a clockwise direction, in Fig. 9, advancing it substantially 180° and correspondingly advancing the spring drum 56 a like angle, through the action of pawl 66. The drum 56 embodies an upper sleeve portion in which are located the notches 57 heretofore described. There are two of these notches spaced 180° apart, and when the drum has been advanced a sufficient distance, the lug 43a on the locking arm 43 engages in the next notch 57, holding the drum in the advanced shutter cocked position. As also heretofore explained, the spring 59 urging the lever in a counter-clockwise direction, in Fig. 1, is of sufficient strength to overpower the effect of spring 46 on drum 44, and the drum is forced downwardly, disengaging clutch 45. The drum 65 has connected thereto a coil spring 67, acting to return it in a counter-clockwise direction, in Fig. 9, to restore it to the position shown in this figure. For this purpose, one end of the spring is connected to a pin 68 fixed to the drum and the other end to a pin 69 fixed in a casing part. This operation occurs when the lever 43 engages in a notch 57, de-clutching drum 44 from the film sprocket 21. In the return rotation of drum 65, the cable 55 is withdrawn from drum 44 and rewound on drum 65. The return rotation is limited by a finger 70 on the periphery of the drum engaging a fixed stop 70a as shown particularly in Fig. 9.

The rotary shutter is now under the increased tension of spring 63 but is restrained in cocked position by a latch 71 pivoted in the frame at 72 and normally urged in a clockwise direction, as shown in Fig. 1, by a coil spring 73. In the cocked position, a finger 71a on lever 71 engages in a notch 74 in the peripheral edge of the rear shutter plate 18, there being two of these notches 180° apart. Assuming the shutter mechanism has been cocked or placed under increased tension, as heretofore described, through the medium of spring 63, for an exposure, the button 75 is momentarily depressed against the force of spring 76, causing a cam means on the lower end of the button stem 75a to engage against a pin 71b, on the latch 71, rocking it counter-clockwise, and releasing lug 71a, permitting the shutter mechanism to rotate in a clockwise direction, as shown in Fig. 1, for 180° until the next notch 74 in the shutter plate 18 moves into position to receive the lug 71a.

The cam means carried by trigger stem 75a is shown better in the reverse view of Fig. 10. A cam 77 is pivoted at 77a on plate 78. In the downward movement of plate 78 and cam 77, pin 71b rides along the right-hand side of the cam, in Fig. 10, until the cam passes beyond it and permits the pin 71b to snap to the left under the pressure of spring 73. In the meantime, lever 71, in Fig. 1, has first been rocked counter-clockwise, releasing lug 71a from the shutter notch 74, and then returned clockwise to engage the next notch 74. This operation ensures against the shutter rotating more than 180° in the event that the operator holds the button 75 depressed for more than the necessary instant. Upon release of button 75 to its upper position, cam 77 may temporarily be forced counterclockwise, in Fig. 10, by pin 71b, permitting the parts to assume the position there shown wherein the lower end of cam 77 will catch pin 71b and force it in the shutter releasing direction when button 75 is next depressed. Cam 77 is normally held against pin 78a on plate 78 by spring 79. It will be understood that cam 77 has sufficient width, that is in the direction perpendicular to the paper in Fig. 10, so that pin 71b will pass along the back edge of the cam without interference with pin 78a or spring 79. The mechanism may embody other features not necessary to illustrate here, such as an interlock to prevent a second operation of the shutter by depression of button 75 until exposed frames have been advanced from their framed positions.

Certain features in the relation of shutter disk 18 and the locking lug 71a on lever 71 will now be described. The disk is generally of uniform radius, but adjacent the notches 74 the radius is enlarged at 18a so that, as the disk in its rotation nears a locked position, its periphery at 18a rubs against the lug 71a to brake the speed. The radius at the portion 18b at the opposite side of notch 74 is of still greater radius so as to ensure that the rear face of notch 74 will engage lug 71a and positively stop the disk 18 at the desired position. A fixed pin 71c limits the inward movement of the lower end of the lever 71 so that beyond the areas 18a and 18b the disk 18 rotates free of contact with the lug 71a on the lever and avoids any drag on the disk while it is rotating through an exposure position.

It is noted that the two rotary shutter sections 18 and 19, and their integral parts 61 and 60, respectively, are locked together so as to rotate in unison. The angular locked positions of the plates 18 and 19 relative to each other may be adjusted, however, to vary the extent of the exposure openings 20. Each plate is provided with a pair of segmental exposure openings, but angular movement of the one with respect to the other causes a blanking off of a corresponding section of the openings in the latter. This adjustment and locking of the two sections in selected position may be effected through the medium of an annular member 80 (see Fig. 4) having an inner sleeve portion slidable in the sleeve 60, but restrained from rotation with respect thereto by a pin 81 fixed in the member 80 and slidable in a slot 82 in the sleeve 60. The upper end of the stem 61 secured to the inner shutter plate 18 is provided with a finger 83 adapted to be received in a series of openings 84 in the upper surface (in Fig. 4) of the member 80. For relative adjustment of the two shutter sections, the member 80 is depressed against spring 85 from engagement with the finger 83 and then rotated, which serves to rotate the sleeve 60 and the forward shutter plate 19, with respect to the plate 18, to a selected angle, and then permitted to move outwardly for engagement of the finger 83 in an opening 84 corresponding to the desired adjustment. Rotation of the disk 19 in a counter-clockwise direction, in Fig. 1, to reduce the extent of the exposure opening, simultaneously rotates the sleeve 60 in a counter-clockwise direction, in Fig. 8, serving to increase the tension on the shutter actuating spring 63. Such an adjustment effects a double function in that, simultaneously with the reduction of the extent of effective exposure opening in the shutter, it serves to increase the tension of main spring 63 so that the speed of the shutter is proportionately increased. In other words, the device operates to ensure faster shutter action, as the shutter openings become smaller. The outer surface of the sleeve member 60 is provided with appropriate indicia 86 to indicate the net value of the time setting. Although the tension of the shutter spring may be adjusted, it should be noted that for any selected adjustment the tensioning each time is of uniform degree.

As heretofore described, the film is advanced alternately one space and three spaces. Using a 35 mm. film, the arrangement of the stereo pairs of frames on the film will be as indicated by the brackets in Fig. 3. That is, the respective frames of a given pair will be separated by one frame of another pair, and the succession of frames will be as illustrated in this figure. The arrangement is such that the film has no blank frames and the images of a given pair are separated by a suitable inter-ocular distance. This result is accomplished without the use of any auxiliary reflecting surfaces, or the need of carrying the film through a circuitous path.

Fig. 1 shows a construction whereby the dial 35 is caused normally to rotate with gear 34 and its shaft 87 but enables manual rotation of the dial independently of its shaft and gear 34 to position it correctly with respect to an index or pointer 88. The upper end of shaft 87 has secured thereon a washer 89, and located between the washer and dial 35 is a leaf type spring 90 which frictionally holds the dial to rotate with the shaft.

As heretofore described, the film counter 35 is directly connected to the film control gear 33. It will be noted, however, that the successive exposure numbers do not immediately follow each other in order. In Fig. 6 the dial 35 is at the No. 1 exposure position corresponding to the No. 1 frames in Fig. 3. In the next advance of the film, the control gear 33 will move 90° and the counter dial 35 will be advanced through a certain angle dependent upon the gear ratio, to bring the No. 2 exposure position on the dial 35 opposite the index 88, and, upon the succeeding advance of the film and rotation of the control gear 33 270°, the dial 35 will be advanced to bring the No. 3 exposure opposite the index.

The operation of initially threading the film in the camera will vary somewhat, depending on the particular details of construction, but in the specific form shown it may be effected in substantially the following manner. It will be assumed that the back cover has been removed and a cartridge 14 been inserted, but the lead end of the film not threaded. The sprocket 21 is rotated in a clockwise direction (as viewed in Fig. 2) by grasping it directly with the fingers until finger 52 engages either stop pin 54 or 54a. The position of dial 35 is then noted; that is, which number thereof is at the index 88. Finger 52 is then released by depressing the knob 31 and rotation of the sprocket continued until the previously engaged stop pin passes the finger 52, whereupon knob 31 is released and rotation of the sprocket continued. Note is taken at dial 35 whether the stop gear 33 has been rotated 90° or 270° when finger 52 next engages a stop pin. Correct rotation of the dial should have been 270° for film threading purposes. If, however, it has been rotated but 90° to the point of engagement of finger and stop pin, then finger 52 is released by means of knob 31 and further rotation of the sprocket continued until the finger next meets a stop pin, which operation will be observed to have rotated the control gear 33 270°. The film is then threaded by inserting the film leader in the slot 15a of the spool 15, the back cover plate is restored, and the film is then advanced by turning knob 31 so that control gear 33 rotates 360°. To accomplish this, knob 31 is turned until finger 52 meets one of the stop pins. The shutter release button 75 is then depressed, following which knob 31 is depressed so that finger 52 may pass the stop pin, and knob 31 then released and rotation thereof continued until finger 52 engages the next stop pin. At this point the film has been properly positioned for the initial exposure and the shutter spring has been tensioned for its operation. Finally, dial 35 is manually set with the No. 1 exposure opposite index 88.

After the film has been completely exposed, it may be returned to the film cartridge 14 by rotation of the knob 14a in conventional manner. In this respect it will be noted that the reverse sides of the pins 54 and 54a or the reverse side of finger 52, or both, are provided with an inclined surface so that lever 50 will be automatically cammed out of position, permitting free reverse rotation of the control gear 33 and connected gears.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a camera, in combination, a shutter mechanism, means for exposing frames of a photosensitive strip film, rotatable means for advancing said film including an axially slidable, manually operable element, a clutch comprising a rotatable driven member and a rotatable driving member, means for rotating said driving member in response to advancement of said film, spring means for holding said driven member normally out of engagement with said driving member, means responsive to axial movement of said manually operable film-advancing element for causing engagement of said clutch members, means responsive to rotation of said driven clutch member for cocking said shutter, means for insuring engagement of said clutch members after film advancement has commenced and irrespective of the axial position of said manually operable film-advancing member, and means for causing said clutch members to disengage when said shutter is cocked.

2. In a camera, in combination, a shutter mechanism, means for exposing frames of a photosensitive strip film, rotatable means for advancing said film including an axially slidable, manually operable element, a film-metering device, means responsive to advancement of said film for actuating said metering device, a plurality of stops carried by said last-mentioned means, means cooperating with said stops and responsive to the axial position of said slidable, manually operable element for limiting the extent of film advancement between each exposure, a clutch comprising a rotatable driven member and a rotatable driving member and a rotatable driving member, means for rotating said driving member in response to advancement of said film, spring means for holding said driven member normally out of engagement with said driving member, means responsive to axial movement of said manually operable film-advancing element for causing engagement of said clutch members, means responsive to rotation of said driven clutch member for cocking said shutter, means for insuring engagement of said clutch members after film advancement has commenced and irrespective of the axial position of said manually operable film-advancing member, and means for causing said clutch members to disengage when said shutter is cocked.

3. In a camera, in combination, a shutter mechanism, means for exposing frames of a photosensitive strip film, rotatable means for advancing said film including an axially slidable, manually operable element, means for limiting the advancement of film between successive exposures comprising a plurality of stops, an element adapted to be moved into and out of the path of movement of said stops in response to changes in the axial position of said manually operable element and means for moving said stops along a predetermined path in response to advancement of said film, a clutch comprising a rotatable driven member and a rotatable driving member, means for rotating said driving member in response to advancement of said film, spring means for holding said driven member normally out of engagement with said driving member, means responsive to axial movement of said manually operable film-advancing element for causing engagement of said clutch members, means responsive to rotation of said driven clutch member for cocking said shutter, means for insuring engagement of said clutch members after film advancement has commenced and irrespective of the axial position of said manually operable film-advancing member, and means for causing said clutch members to disengage when said shutter is cocked.

4. In a camera, in combination, a shutter mechanism, means for exposing frames of a photosensitive strip film, rotatable means for advancing said film including an axially slidable, manually operable element, means comprising a plurality of stops and an element movable in response to changes in the axial position of said manually operable element and cooperating with said stops to differently limit advancement of said film after each of any two successive exposures, a clutch comprising a rotatable driven member and a rotatable driving member, means for rotating said driving member in response to advancement of said film, spring means for holding said driven member normally out of engagement with said driving member, means responsive to axial movement of said manually operable film-advancing element for causing engagement of said clutch members, means responsive to rotation of said driven clutch member for cocking said shutter, means for insuring engagement of said clutch members after film advancement has commenced and irrespective of the axial position of said manually operable film-advancing member, and means for causing said clutch members to disengage when said shutter is cocked.

ALBERT J. BACHELDER.

REFERENCES CITED

The following references are of record in the file of this patent:

UNITED STATES PATENTS

| Number | Name | Date |
| --- | --- | --- |
| 564,494 | Withington | July 21, 1896 |
| 1,117,637 | Colardeau | Nov. 17, 1914 |
| 1,124,313 | Pierman | Jan. 12, 1915 |
| 2,090,017 | Young | Aug. 17, 1937 |
| 2,126,324 | Harmon | Aug. 9, 1938 |
| 2,169,001 | Mihalyi | Aug. 8, 1939 |
| 2,245,213 | Mihalyi | June 10, 1941 |
| 2,328,677 | Ringer | Sept. 7, 1943 |
| 2,345,999 | Babcock | Apr. 4, 1944 |
| 2,385,183 | Avers | Sept. 18, 1945 |

Certificate of Correction

Patent No. 2,476,576

July 19, 1949

ALBERT J. BACHELDER

It is hereby certified that error appears in the printed specification of the above numbered patent requiring correction as follows:

Column 9, line 28, strike out the words "and a rotatable driving member"; and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*